United States Patent
Brown et al.

(10) Patent No.: US 8,090,853 B2
(45) Date of Patent: Jan. 3, 2012

(54) DATA ACCESS CONTROL

(75) Inventors: William A. Brown, Raleigh, NC (US);
Daniel D. Carr, Beaverton, OR (US);
Richard William Muirhead, Tyler, TX (US); Francis Xavier Reddington, Sarasota, FL (US); Martin Andrew Wolfe, Mooresville, NC (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 12/628,301

(22) Filed: Dec. 1, 2009

(65) Prior Publication Data

US 2011/0131339 A1 Jun. 2, 2011

(51) Int. Cl.
*G06F 15/16* (2006.01)
*G06F 7/04* (2006.01)

(52) U.S. Cl. .............................. 709/229; 726/4
(58) Field of Classification Search .................... 709/229
See application file for complete search history.

(56) References Cited

U.S. PATENT DOCUMENTS

| | | | |
|---|---|---|---|
| 6,236,994 B1 | 5/2001 | Swartz et al. | |
| 7,457,279 B1 * | 11/2008 | Scott et al. | 370/352 |
| 2005/0055570 A1 * | 3/2005 | Kwan et al. | 713/201 |
| 2006/0168253 A1 * | 7/2006 | Baba et al. | 709/229 |
| 2006/0224998 A1 | 10/2006 | Riss et al. | |
| 2007/0214499 A1 * | 9/2007 | Clymer et al. | 726/4 |
| 2009/0064285 A1 * | 3/2009 | Takahashi | 726/4 |
| 2009/0125796 A1 | 5/2009 | Day et al. | |
| 2009/0168995 A1 * | 7/2009 | Banga et al. | 380/28 |
| 2009/0217353 A1 * | 8/2009 | Zheng | 726/3 |
| 2009/0282468 A1 * | 11/2009 | Banga et al. | 726/8 |
| 2010/0057924 A1 * | 3/2010 | Rauber et al. | 709/229 |
| 2010/0269155 A1 * | 10/2010 | Droms et al. | 726/3 |
| 2010/0299523 A1 * | 11/2010 | Henry et al. | 713/168 |
| 2011/0055299 A1 * | 3/2011 | Phillips | 707/827 |

OTHER PUBLICATIONS

Atkinson et al.; Distributed Architecture for Data Mining and Integration; 11 pages.
U.S. Appl. No. 12/606,260, filed Oct. 27, 2009.

* cited by examiner

*Primary Examiner* — Aaron Strange
*Assistant Examiner* — James Edwards
(74) *Attorney, Agent, or Firm* — Schmeiser, Olsen & Watts; Ann Linne

(57) ABSTRACT

A data access control method and system. The method includes receiving by a computer processor from a requestor, a request for access to data. The computer processor extracts from the request, a requestor identification string associated with the requestor. The computer processor verifies a match for the requestor identification string, a service requestor identification string, a requestor software component operating process identification string, a requestor server identification string, a requestor hardware device network address and a requestor MAC address, and a requestor hardware device identification string against a plurality of registries. The computer processor generates an access point door associated with a specified logical storage room representation comprising the data. The computer processor enables access to the data via the access point door and the specified logical storage room representation based on enabling a logical lock with a logical key and a valid timestamp.

18 Claims, 7 Drawing Sheets

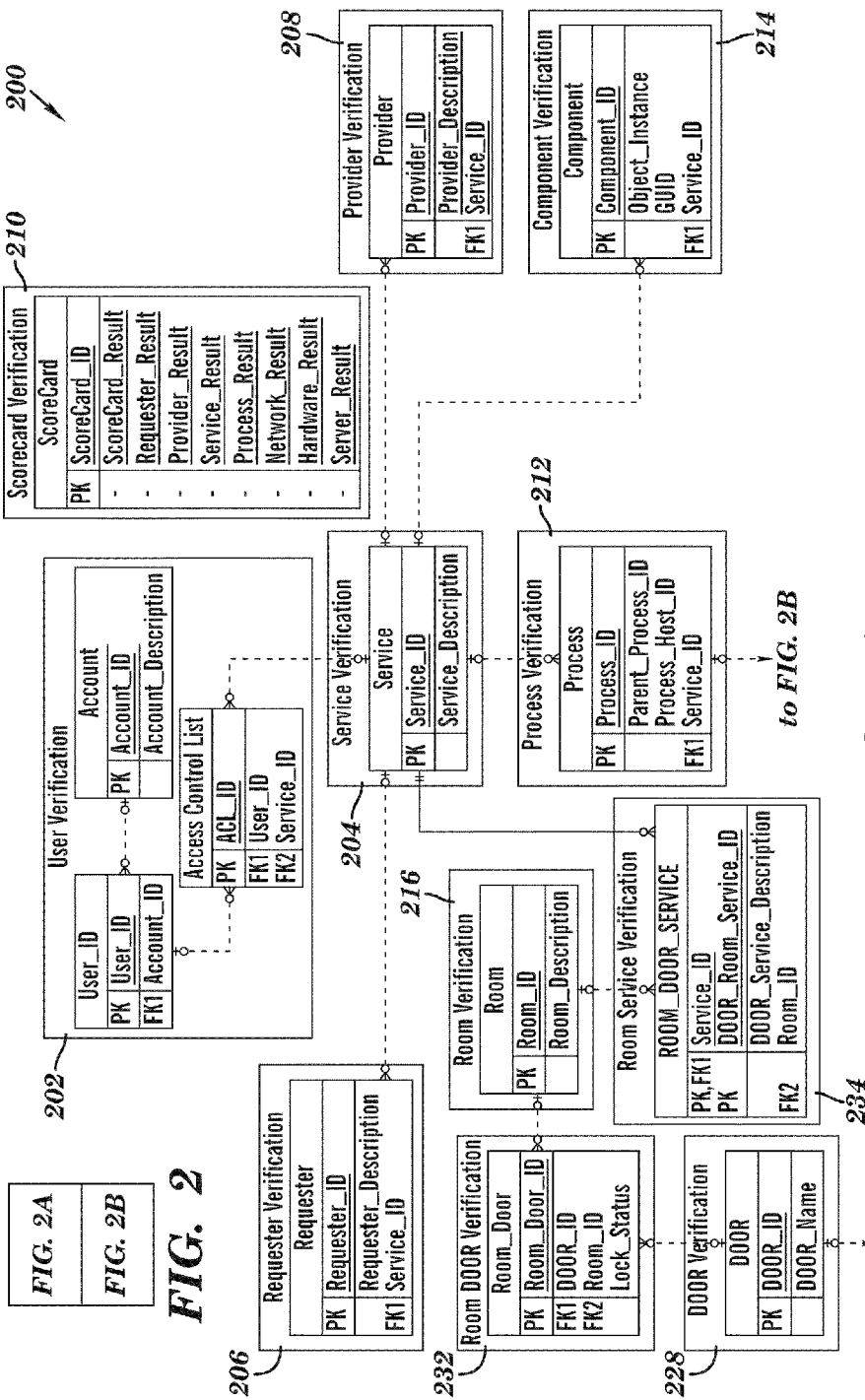

DATA ACCESS CONTROL

FIELD OF THE INVENTION

The present invention relates to a method and associated system for securing and controlling access to stored data.

BACKGROUND OF THE INVENTION

Controlling access to information typically comprises an inefficient process with little flexibility. Systems are typically required to control access to information using a simple security means which may be inefficient. Control access to information using a simple security means may not provide adequate security for the information.

SUMMARY OF THE INVENTION

The present invention provides a method comprising:

receiving, by a computer processor of a computing system from a requestor, a request for access to specified data;

extracting, by said computer processor from said request, a requestor identification string associated with said requestor;

first verifying, by said computer processor, said requestor identification string against a requestor registry;

retrieving, by said computer processor, a service requestor identification string associated with a service requesting said specified data;

second verifying, by said computer processor, said service requestor identification string against a service registry;

retrieving, by said computer processor, a requestor software component operating process identification string associated with a requestor software component requesting said specified data;

third verifying, by said computer processor, said requestor software component operating process identification string against a process registry;

retrieving, by said computer processor, a requestor server identification string associated with a requestor server requesting said specified data;

fourth verifying, by said computer processor, said requestor server identification string against a server registry;

retrieving, by said computer processor, a requestor hardware device network address and a requestor media access control (MAC) address associated with a requestor hardware device requesting said specified data;

fifth verifying, by said computer processor, said requestor hardware device network address and said requestor MAC address against a network registry;

retrieving, by said computer processor, a requestor hardware device identification string associated with said requestor hardware device requesting said specified data;

sixth verifying, by said computer processor, said requestor hardware device identification string against a device registry;

extracting, by said computer processor from said request, a provider identification string associated with a provider of said specified data;

seventh verifying, by said computer processor, a match for said provider identification string against a provider registry;

retrieving, by said computer processor, a service provider identification string associated with a service providing said specified data;

eighth verifying, by said computer processor, a match for said service provider identification string against said service registry;

retrieving, by said computer processor, a provider software component operating process identification string associated with a provider software component providing said specified data;

ninth verifying, by said computer processor, a match for said provider software component operating process identification string against said process registry;

retrieving, by said computer processor, a provider server identification string associated with a provider server providing said specified data;

tenth verifying, by said computer processor, a match for said provider server identification string against said server registry;

retrieving, by said computer processor, a provider hardware device identification string associated with said provider hardware device providing said specified data; and eleventh verifying, by said computer processor, a match for said provider hardware device identification string against said device registry generating, by said computer processor, an access point door associated with a specified logical storage room representation, said logical storage room representation comprising a storage space comprised by a plurality of different storage mediums and physical storage locations, said logical storage room representation comprising said specified data;

cross-referencing, by said computer processor, verification results of said first verifying, said second verifying, said third verifying, said fourth verifying, said fifth verifying, said sixth verifying, said seventh verifying, said eighth verifying, said ninth verifying, said tenth verifying, and said eleventh verifying;

generating, by said computer processor, a scorecard comprising results of said cross-referencing, wherein said scorecard comprises: a Score_Card ID entry comprising a unique record for each scorecard record; a Scorecard Results entry providing a tabulated value of the scorecard and determining pass or failure of a combined verification test; and a plurality of verification results entries comprising said verification results;

determining, by said computer processor, that said scorecard comprises a valid integration pattern;

generating, by said computer processor based on said valid integration pattern, a logical key associated with said access point door;

generating, by said computer processor based on said valid integration pattern, a logical lock associated with said logical key;

enabling, by said computer processor, said logical lock with said logical key;

determining, by said computer processor based, that a time stamp associated with said logical lock and said logical key is valid;

enabling, by said computer processor based on said scorecard comprising said results of said cross-referencing, said valid integration pattern, said enabling said logical lock with said logical key, and said time stamp being valid, access to said specified data via said access point door and said specified logical storage room representation; and disabling, by said computer processor, said logical lock using said logical key.

The present invention provides a computing system comprising a computer processor coupled to a computer-readable memory unit, said memory unit comprising instructions that when enabled by the computer processor implements a verification method comprising:

receiving, by said computer processor from a requestor, a request for access to specified data;

extracting, by said computer processor from said request, a requestor identification string associated with said requestor;

first verifying, by said computer processor, said requestor identification string against a requestor registry;

retrieving, by said computer processor, a service requestor identification string associated with a service requesting said specified data;

second verifying, by said computer processor, said service requestor identification string against a service registry;

retrieving, by said computer processor, a requestor software component operating process identification string associated with a requestor software component requesting said specified data;

third verifying, by said computer processor, said requestor software component operating process identification string against a process registry;

retrieving, by said computer processor, a requestor server identification string associated with a requestor server requesting said specified data;

fourth verifying, by said computer processor, said requestor server identification string against a server registry;

retrieving, by said computer processor, a requestor hardware device network address and a requestor media access control (MAC) address associated with a requestor hardware device requesting said specified data;

fifth verifying, by said computer processor, said requestor hardware device network address and said requestor MAC address against a network registry;

retrieving, by said computer processor, a requestor hardware device identification string associated with said requestor hardware device requesting said specified data;

sixth verifying, by said computer processor, said requestor hardware device identification string against a device registry;

extracting, by said computer processor from said request, a provider identification string associated with a provider of said specified data;

seventh verifying, by said computer processor, a match for said provider identification string against a provider registry;

retrieving, by said computer processor, a service provider identification string associated with a service providing said specified data;

eighth verifying, by said computer processor. a match for said service provider identification string against said service registry;

retrieving, by said computer processor, a provider software component operating process identification string associated with a provider software component providing said specified data;

ninth verifying, by said computer processor, a match for said provider software component operating process identification string against said process registry;

retrieving, by said computer processor, a provider server identification string associated with a provider server providing said specified data;

tenth verifying, by said computer processor, a match for said provider server identification string against said server registry;

retrieving, by said computer processor, a provider hardware device identification string associated with said provider hardware device providing said specified data; and eleventh verifying, by said computer processor, a match for said provider hardware device identification string against said device registry;

generating, by said computer processor, an access point door associated with a specified logical storage room representation, said logical storage room representation comprising a storage space comprised by a plurality of different storage mediums and physical storage locations, said logical storage room representation comprising said specified data;

cross-referencing, by said computer processor, verification results of said first verifying, said second verifying, said third verifying, said fourth verifying, said fifth verifying, said sixth verifying, said seventh verifying, said eighth verifying, said ninth verifying, said tenth verifying, and said eleventh verifying;

generating, by said computer processor, a scorecard comprising results of said cross-referencing, wherein said scorecard comprises: a Score Card ID entry comprising a unique record for each scorecard record; a Scorecard Results entry providing a tabulated value of the scorecard and determining pass or failure of a combined verification test; and a plurality of verification results entries comprising said verification results;

determining, by said computer processor, that said scorecard comprises a valid integration pattern;

generating, by said computer processor based on said valid integration pattern. a logical key associated with said access point door;

generating, by said computer processor based on said valid integration pattern, a logical lock associated with said logical key;

enabling, by said computer processor, said logical lock with said logical key;

determining, by said computer processor based, that a time stamp associated with said logical lock and said logical key is valid;

enabling, by said computer processor based on said scorecard comprising said results of said cross-referencing, said valid integration pattern, said enabling said logical lock with said logical key, and said time stamp being valid, access to said specified data via said access point door and said specified logical storage room representation; and disabling, by said computer processor, said logical lock using said logical key.

The present invention provides a method comprising:

defining, by a computer processor of a computing system, a requestor identification string associated with a requestor of data;

adding, by said computer processor, said requestor identification string to a requestor registry;

generating, by said computer processor, a requester verification component configured to enable a verification process that authenticates a service recluester identification string match within a service request and defined with said requester registry, wherein said requester verification component comprises a requester table listing all registered requesters for services, and wherein said requester table comprises a Requester ID entry comprising a unique record for each requester record and a Requester Description entry describing each said requester;

defining, by said computer processor, a provider identification string associated with a provider of said data;

adding, by said computer processor, said provider identification string to a provider registry;

generating, by said computer processor, a provider verification component configured to enable a verification process authenticating service provider identification within a service request and defined with said provider registry, wherein said provider verification component comprises a provider table listing all registered providers of services, wherein the provider table comprises a Provider ID entry comprising a unique record for each provider record and a Provider Description entry describing each said provider;

defining, by said computer processor, a service identification string associated with services associated with said data;

adding, by said computer processor, said service identification string to a security registry;

generating, by said computer processor, a service verification component configured to enable a verification process that authenticates said services comprising an internal application interface to a function, wherein said service verification component comprises a service table comprising service records;

generating, by said computer processor, a security data model comprising said requester verification component, said provider verification component, and said service verification component;

deploying, by said computer processor, said services to a server platform;

adding, by said computer processor, results of said deploying to a server registry;

executing, by said computer processor, said security data model, wherein said executing said security data model results in:

generating, by said computer processor, an access point door associated with a specified logical storage room representation, said logical storage room representation comprising a storage space comprised by a plurality of different storage mediums and physical storage locations, said logical storage room representation comprising said data;

cross-referencing, by said computer processor, verification results of: verifying a match for said recluestor identification string against said recluestor registry; verifying a match for said service reciuestor identification string against said service registry; verifying a match for a requestor software component operating process identification string against a process registry; verifying a match for a reguestor server identification string against said server registry; verifying a match for a reguestor hardware device network address and a reguestor MAC address against a network registry; verifying a match for a requestor hardware device identification string against a device registry; verifying a match for said provider identification string against said provider registry; verifying a match for a service provider i dentification string against said service registry; verifying a match for a provider software component operating process identification string against said process registry; verifying a match for a provider server identification string against said server registry; verifying a match for a provider hardware device identification string against said device registry;

generating, by said computer processor, a scorecard comprising results of said cross-referencing, wherein said scorecard comprises: a Score Card ID entry comprising a unique record for each scorecard record of scorecard records; a Scorecard Results entry providing a tabulated value of the scorecard and determining pass or failure of a combined verification test; and a plurality of verification results entries comprising said verification results;

determining, by said computer processor, that said scorecard comprises a valid integration pattern;

generating, by said computer processor based on said valid integration pattern, a logical key associated with said access point door;

generating, by said computer processor based on said valid integration pattern, a logical lock associated with said logical key;

enabling, by said computer processor, said logical lock with said logical key;

determining, by said computer processor based, that a time stamp associated with said logical lock and said logical key is valid; and enabling, by said computer processor based on said scorecard comprising said results of said cross-referencing, said valid integration pattern, said enabling said logical lock with said logical key, and said time stamp being valid, access to said data via said access point door and said specified logical storage room representation; and disabling, by said computer processor, said logical lock using said logical key.

The present invention advantageously provides a simple method and associated system capable of controlling access to information.

DETAILED DESCRIPTION OF THE INVENTION

Figure 1:
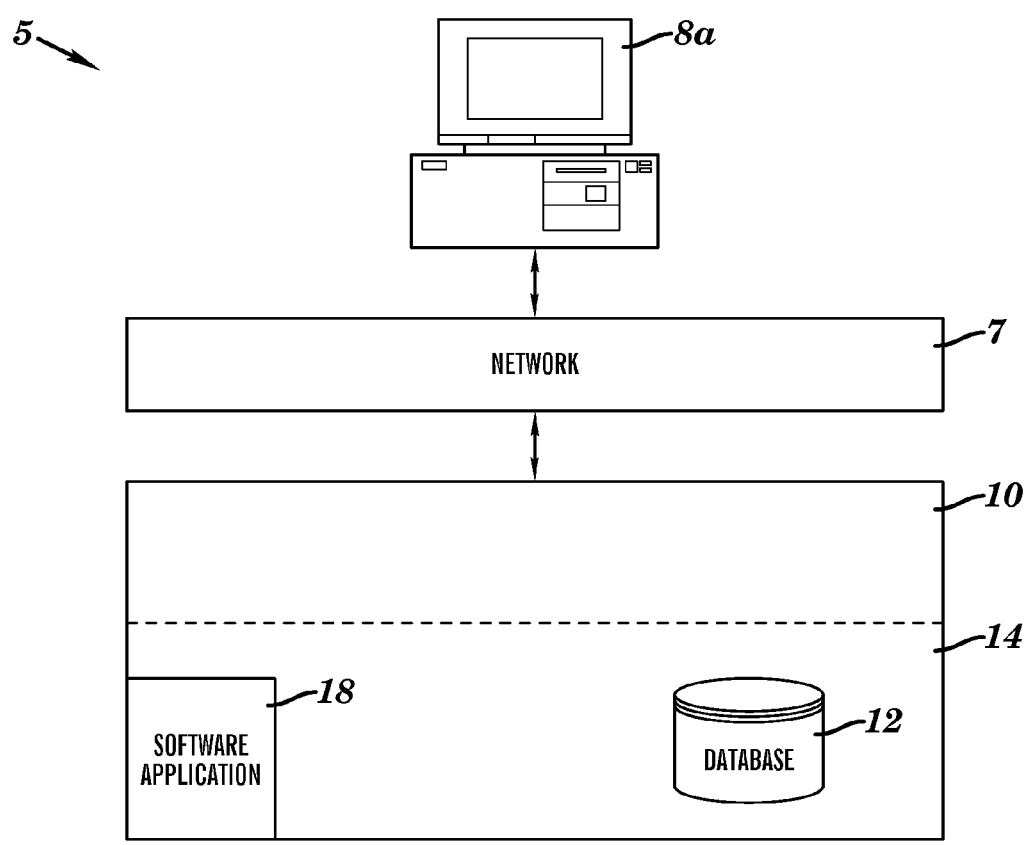
FIG. 1 illustrates a system for securing access to distributed data, in accordance with embodiments of the present invention.

FIG. 1 illustrates a system 5 for securing access to distributed data across multiple data storage mediums and different physical storage locations, in accordance with embodiments of the present invention. System 5 comprises a secure distributed object-oriented retrieval and storage (DOORS) system for securing access to data (e.g., from a plurality of different types of storage mediums and different physical storage locations). The DOORS system provides a universal 3 dimensional (3D) relative positioning interface to a framework that enables a standardized means of simultaneous secure access, retrieval, storage, and management capabilities of diverse and federated data sources. Each hardware and software component (i.e., associated with multiple processes associated with a requestor and supplier of data) of system 5 comprises an identification number or string that must be verified against an associated registry(s) before enabling access to specified data. The specified data is stored in a logical storage room representation and access to the specified data is provided by an access point door. A logical storage room representation is defined herein as a logical storage space (for data) that may be comprised by a plurality of different storage mediums and physical storage locations. An access point door is defined herein as a secure access point for allowing access to a logical storage room representation.

System 5 provides the following functionality associated with providing secure access to data:
1. Integration between hardware devices and software components by providing a means to confirm and verify integration resources within system 5.
2. A secondary internal security layer within an existing application security layer that interfaces to an enterprise data management system.
3. Authenticate-able provisioned hardware and software components.
4. Storing authenticating security signatures for all system hardware and software components.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., securely retrieving data from) computing system 10. Computing system 10 may comprise any type of computing system(s) including, inter alia, a personal computer (PC), a server computer, a database computer, etc. Computing system 10 is used to securely store and provide access to data. Computing system 10 may comprise a multi-sourced user accessible context and content driven data access computer comprising an application architectural component that performs the work of intelligent secure retrieval and storage of contextual content from multiple storage locations and types. Computing system 10 comprises a memory system 14. Memory system 14 may comprise a single memory system. Alternatively, memory system 14 may comprise a plurality of memory systems. Memory system 14 comprises a software application 18 and a database 12. Database 12 may comprise multiple databases. Database 12 comprises all retrieved data (i.e., retrieved from computing apparatus 8a) and any generated data (e.g., data layer model 200 as described with respect to FIG. 2). System 5 comprises a DOORS system providing an interface to a framework that enables a standardized means of access, retrieval, storage, and management capabilities of diverse and federated data sources (i.e., a plurality of different storage mediums and different physical storage locations) across an enterprise model through a virtual architectural data access layer.

Software application 18 enables the following functions associated with secure data storage and retrieval.
1. Verifying a requestor (i.e., of data) identification string match (e.g., password) against a requestor registry.
2. Verifying a provider (i.e., of data) identification string match (e.g., password) against a provider registry.
3. Verifying a service requestor identification string match (associated with a service requesting the data) and a service provider identification string match (associated with a service providing the data) against a service registry.
4. Verifying a requestor software component operating process identification string match (associated with a requestor software component requesting the data) and a provider software component operating process identification string match (associated with a software component providing the data) against a process registry.
5. Verifying a requestor server identification string match (associated with a requestor server requesting the data) and a provider server identification string match (associated with a provider server providing the data) against a server registry.
6. Verifying a requestor hardware device network address and media access control (MAC) address (i.e., associated with a requestor hardware device requesting the data) and a provider hardware device network address MAC address (i.e., associated with a provider hardware device providing the data) against a network directory.
7. Verifying a requestor hardware device identification string match and a provider hardware device identification string match against a device registry.
8. Generating an access point door associated with a logical storage room representation comprising the data.
9. Enabling (i.e., based results of the verifying process performed in steps 1-7) access to the data via the access point door and the logical storage room representation.

Figure 2B:
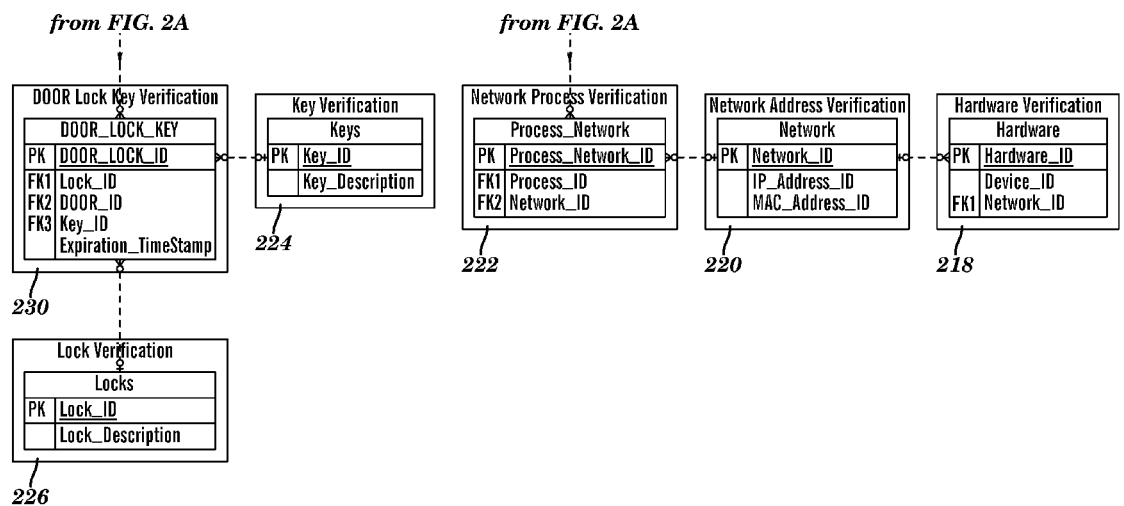
FIG. 2 illustrates a data model used to implement the system of FIG. 1 for securing access to distributed data, in accordance with embodiments of the present invention.

FIG. 2 illustrates a data model 200 used to implement system 5 of FIG. 1 for securing access to distributed data, in accordance with embodiments of the present invention. Data model 200 in FIG. 2 comprises a graphical representation of a security data model. Data model 200 comprises the following components:
1. A user verification component 202 enabling a verification process for authenticating: user credentials defined within a user registry, a user account defined within an account registry, and a user access control list (permissions for resources) defined within a user access control list registry. User verification component 202 comprises the following table entries:
　A. A user table comprising all records of users on the system. The user table comprises a User_ID header describing a unique identifier for each user record.
　B. An account table comprising user accounts on the system. The account table comprises an Account_ID header describing a unique record of each account record.
　C. An access control list identifying services that a user has access to. The access control list comprises an ACL_ID header comprising a unique identifier for each access control list record.
2. A Service Verification component 204 enabling a verification process that authenticates a service comprising an internal application interface to a function and is defined with a service registry. Service verification component 204 comprises the following table entries:
　A. A service table comprising service records. The service table comprises a Service_ID header comprising a unique identifier for each service record and a Service_Description header describing a service.
3. A requester verification component 206 enabling a verification process that authenticates a service requester identification string match within a service request and defined with a requester registry. Requester verification component 206 comprises a requester table listing all registered requesters for services. The requester table comprises a Requester_ID entry (i.e., comprising a unique record for each requester record) and a Requester_Description entry describing each requester.
4. A provider verification component 208 enabling a verification process authenticating service provider identification within a service request and defined with a provider registry. Provider verification component 208 comprises a provider table listing all registered providers of the services. The provider table comprises a Provider_ID entry (i.e., comprising a unique record for each provider record) entry and a Provider_Description entry describing each provider.
5. A scorecard verification component 210 enabling a verification process authenticating scorecard test results defined within a scorecard registry. Scorecard verification component 210 comprises a score card table comprising all verification test results. The score card table comprises a ScoreCard_ID entry (i.e., comprising a unique record for each scorecard record), a Scorecard_Results entry (i.e., providing a tabulated value of the scorecard and determining pass or failure of a combined verification test), a Requester_Result entry (i.e., comprising a result of requester verification), a Provider_Result entry comprising a result of provider verification), a Service_Result entry (i.e., comprising a result of service verification), a Process_Result entry (i.e., comprising a result of process verification), a Network_Result entry (i.e., comprising a result of network verification), a Hardware_Result entry (i.e., comprising a result of hardware verification), and a Server_Result entry comprising a result of server verification).

6. A process verification component 212 enabling a verification process for authenticating a process id and parent process identification defined with a process registry. Process verification component 212 comprises a process-table comprising all process and parent process identifiers. The process table comprises a Process_ID entry (i.e., comprising a unique identifier for each process) and a Parent_Process_ID entry (i.e., comprising an identifier for each process and parent process).

7. A component verification component 214 enabling a verification process for authenticating a Component ID and/or a GUID defined within a component registry. Component verification component 214 comprises a Component_ID table comprising a unique identifier for each component record. Component_ID table comprises a GUID entry (Globally Unique Identifier associated with an operating system) and an Object_Instance entry (i.e., comprising a reference to an object in memory).

8. A room verification component 216 enabling a verification process for authenticating a Room ID table within a Room registry. Room_ID table comprises a Room_Description component describing a room record.

9. A hardware verification component 218 enabling a verification process for authenticating a hardware and device ID table within a hardware registry. The hardware and device ID table comprises a Hardware_ID entry (i.e., comprising a unique identifier for each hardware record) and a Device_ID entry (i.e., comprising a unique identifier for each hardware device).

10. A network address verification component 220 enabling a verification process for authenticating an IP and/or MAC Address within a network address registry. Network address verification component 220 comprises a Network_ID table comprising records of each identified network. Network_ID table (i.e., comprising a Network_ID unique identifier for each network record) comprises an IP_Address_ID entry (i.e., comprising a unique identifier that points to peach IP address on a network) and a MAC_Address_ID entry (i.e., comprising a unique identifier pointing to each MAC Address on the network).

11. A network process verification component 222 enabling a verification process for authenticating a Process ID and Network ID within a network process registry. Network process verification component 222 comprises a Process_Network table associating processes with networks.

12. A key verification component 224 enabling a verification process for authenticating a Key ID (i.e., a unique identifier for each key record) within a Key registry.

13. A lock verification component 226 enabling a verification process for authenticating a Lock ID (i.e., a unique identifier for each lock) within a Lock registry.

14. A door verification component 228 enabling a verification process for authenticating a Door ID (i.e., a unique identifier for each door record) within a Door registry.

15. A door lock key verification component 230 enabling a verification process for authenticating a Door Lock Key ID within a Door Lock Key registry.

16. A room door verification 232 component enabling a verification process for authenticating a Room Door ID within Room Door registry.

Figure 3:
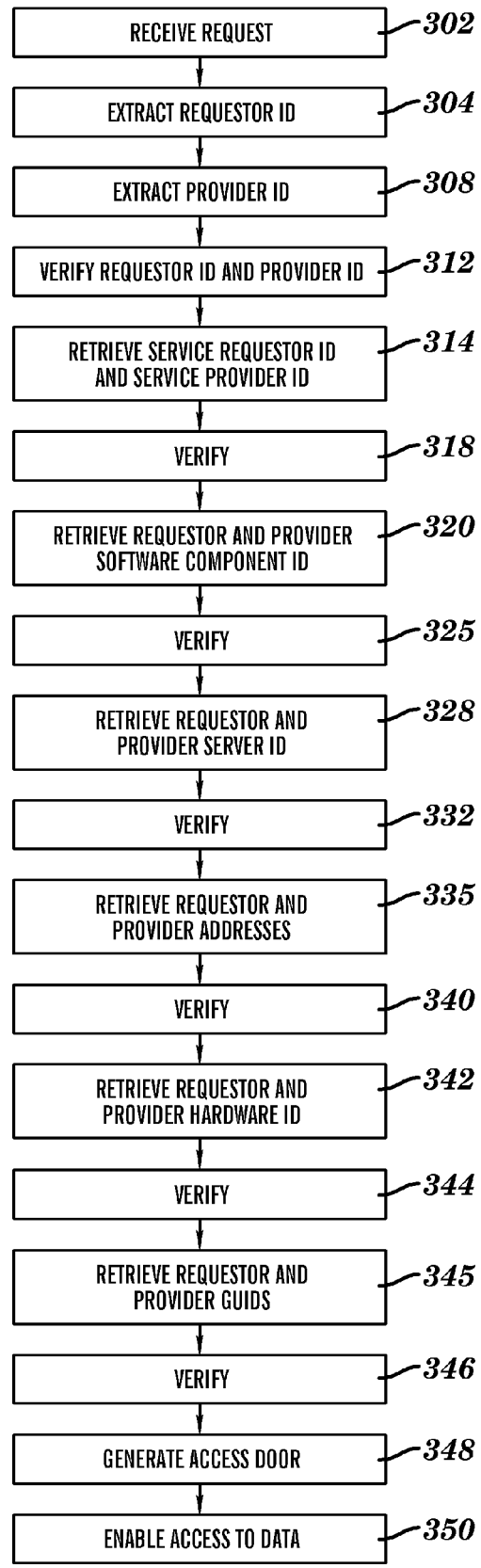
FIG. 3 illustrates a flowchart describing an algorithm used by system of FIG. 1 for securing access to distributed data across multiple data storage mediums and different physical storage locations, in accordance with embodiments of the present invention.

17. A room service verification component 234 enabling a verification process for authenticating a Room Service ID within a Room Service registry FIG. 3 illustrates a flowchart describing an algorithm used by system 5 of FIG. 1 for securing access to distributed data across multiple data storage mediums and different physical storage locations, in accordance with embodiments of the present invention. In step 302, a computing system (e.g., computing system 5 of FIG. 1) receives (i.e., from a requestor) a request for access to specified data. In step 304, the computing system extracts (i.e., from the request) a requestor identification string match associated with the requestor. In step 308, the computing system extracts (i.e., from the request) a provider identification string match associated with a provider of the specified data. In step 312, the computing system verifies (i.e., for a match) the requestor identification string match against a requestor registry and the provider identification string match against a provider registry. In step 314, the computing system retrieves a service requestor identification string match (i.e., associated with a service requesting the specified data) and a service provider identification string match (i.e., associated with a service providing the specified data). In step 318, the computing system verifies (i.e., for a match) the service requestor identification string match and the provider identification string match against a service registry. In step 320, the computing system retrieves a requestor software component operating process identification string match (i.e., associated with a requestor software component requesting the specified data) and a provider software component operating process identification string match (i.e., associated with a provider software component providing the specified data). In step 325, the computing system verifies (i.e., for a match) the requestor software component operating process identification string match and the provider software component operating process identification string match against a process registry. In step 328, the computing system retrieves a requestor server identification string match (i.e., associated with a requestor server requesting the specified data) and a provider server identification string match (i.e., associated with a provider server providing the specified data). In step 332, the computing system verifies (i.e., for a match) the requestor server identification string match and the provider server identification string match against a server registry. In step 335, the computing system retrieves a requestor hardware device network address and a requestor media access control (MAC) address (i.e., associated with a requestor hardware device requesting the specified data). In step 335, the computing system additionally retrieves a provider hardware device network address and a provider MAC address (i.e., associated with a provider hardware device providing the specified data). In step 340, the computing system verifies (i.e., for a match) the requestor hardware device network address, the requestor MAC address, the provider hardware device network address, and the provider MAC address against a network registry. In step 342, the computing system retrieves a requestor hardware device identification string match (i.e., associated with the requestor hardware device requesting the specified data) and a provider hardware device identification string match (i.e., associated with the provider hardware device providing the specified data). In step 344, the computing system verifies (i.e., for a match) the requestor hardware device identification string match and the provider hardware device identification string match against a device registry. In optional step 346, the computing system retrieves a first global unique identifier (GUID) (i.e., associated with a requester operating system requesting the specified data) and a second GUID (i.e., associated with a provider operating system providing the specified data). In step 346, the computing system verifies (i.e., for a match) the first GUID and the second GUID against a GUID validator. In step 348, the computing system generates an access point door (e.g., by appending a specified sequence generated number to a random number) associated with a specified logical storage room representation comprising the specified data. A sequence generated by appending a specified sequence generated number to a random number will add a next number in the sequence in order to assure that there is no probability of a duplicated concatenated number even in the remote probability that a duplicate random number is generated. In step 350, the computing system enables (i.e., based on results of the verification process of steps 312, 318, 325, 332, 340, 344, and 346) access to the specified data via the access point door and the specified logical storage room representation.

Figure 4:
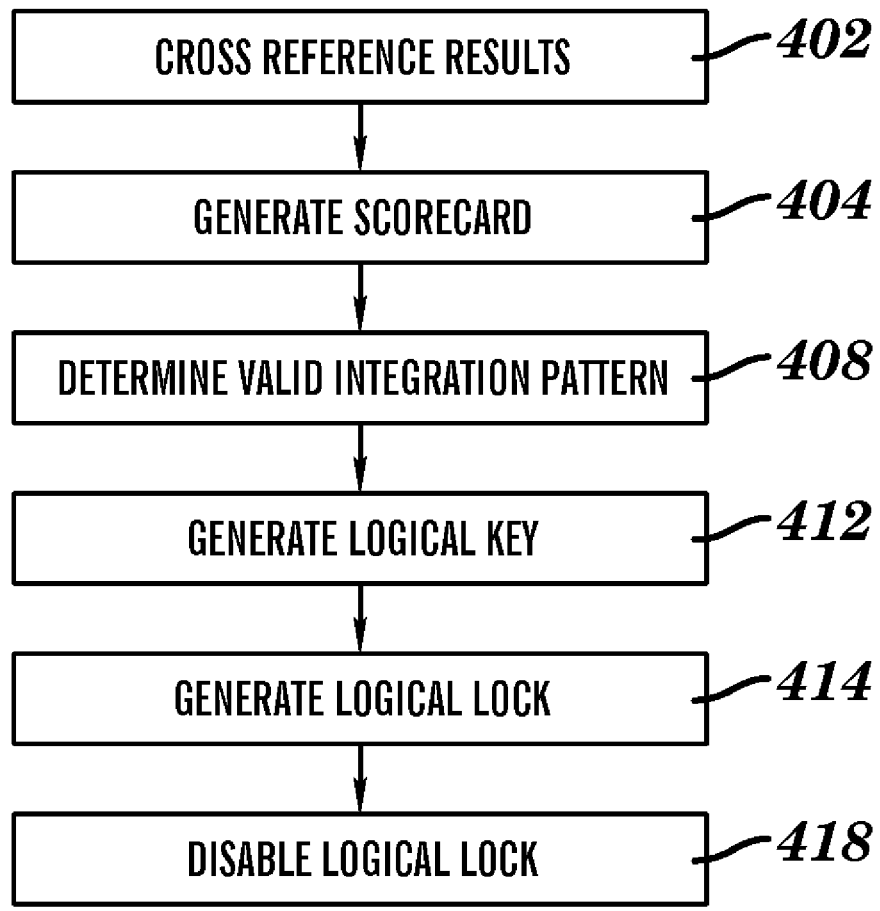
FIG. 4 illustrates a flowchart detailing the enabling step of the algorithm of FIG. 3, in accordance with embodiments of the present invention.

FIG. 4 illustrates a flowchart detailing step 350 of the algorithm of FIG. 3, in accordance with embodiments of the present invention. In step 402, the computing system cross-references results of the verification process of steps 312, 318, 325, 332, 340, 344, and 346 associated with the requestor identification string match (i.e., requestor identification string match, service requestor identification string match, requestor software component operating process identification string match, requestor server identification string match, requestor hardware device network address and requestor MAC address, requestor hardware device identification string match, and first GUID) with results of the verification process of steps 312, 318, 325, 332, 340, 344, and 346 associated with the provider verification strings (i.e., provider identification string match, service provider identification string match, provider software component operating process identification string match, provider server identification string match, provider hardware device network address and provider MAC address, provider hardware device identification string match, and second GUID). In step 404, the computing system generating a scorecard comprising results of the cross-referencing process of step 402. In step 408, the computing system determines that the scorecard comprises a valid integration pattern. In step 412, the computing system generates a logical key (i.e., based on the valid integration pattern) associated with the access point door. The logical key may be generated by appending a specified sequence generated number to a random number. In step 414, the computing system generates a logical lock (i.e., based on the valid integration pattern) associated with the logical key and optionally determines a valid time stamp associated with the logical lock and key. The logical lock may be generated by appending a specified sequence generated number to a random number. In step 418, the computing system disables the logical lock using the logical key.

Figure 5:
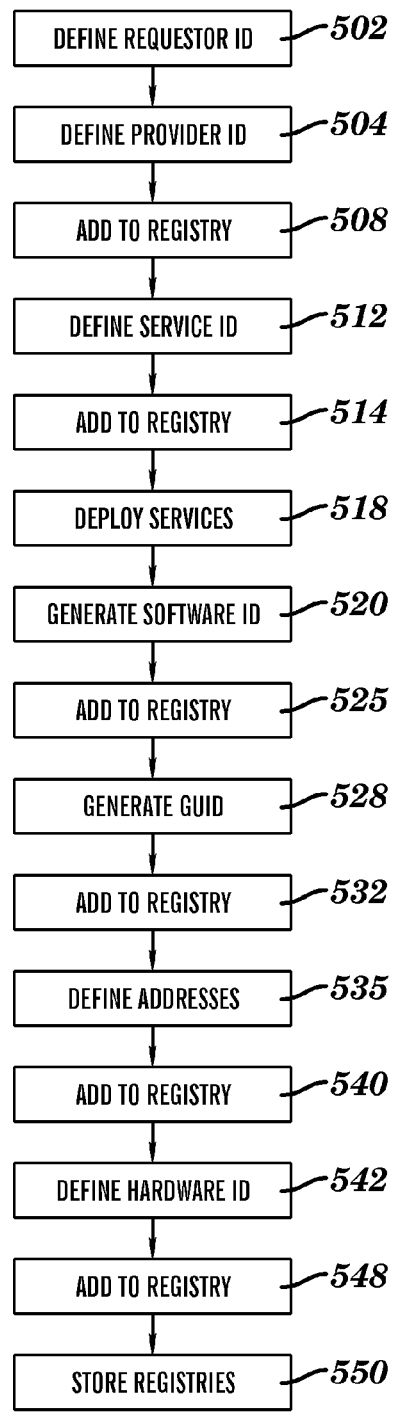
FIG. 5 illustrates a flowchart describing an algorithm used by the system of FIG. 1 for generating registries used for enabling a process for securing access to distributed data across multiple data storage mediums and different physical storage locations, in accordance with embodiments of the present invention.

FIG. 5 illustrates a flowchart describing an algorithm used by system 5 of FIG. 1 for generating registries used for enabling a process for securing access to distributed data across multiple data storage mediums and different physical storage locations, in accordance with embodiments of the present invention. In step 502, a computing system (e.g., computing system 5 of FIG. 1) defines a requestor identification string associated with a requestor of data. In step 504, the computing system defines a provider identification string associated with a provider of the data. In step 508, the computing system adds the requestor identification string to a requestor registry and the provider identification string to a provider registry. In step 512, the computing system defines a service identification string associated with services providing the data. In step 514, the computing system adds the services identification string to a security registry. In step 518, the computing system deploys the services to a server platform and adds results (i.e., associated with deploying the services to the server platform) to a server registry. In step 520, the computing system defines a software component operating identification string associated with the data. In step 525, the computing system adds the software component operating identification string to a process registry. In step 528, the computing system generates a software component GUID associated with the data. In step 532, the computing system adds the software component GUID to a GUID registry. In step 535, the computing system defines a network address and a media access control (MAC) address associated with the requestor and the provider of the data. In step 540, the computing system adds the network addresses and the MAC addresses to a network registry. In step 542, the computing system defines a hardware device identification string associated with the data. In step 548, the computing system adds the hardware device identification string to a hardware registry. In step 550, the computing system stores the requestor registry, the provider registry, the security registry, the server registry, the process registry, the GUID registry, the network registry, and the hardware registry. The aforementioned registries are used for implementing the process for securing access to distributed data as described with respect to the algorithm of FIG. 2, supra.

Figure 6:
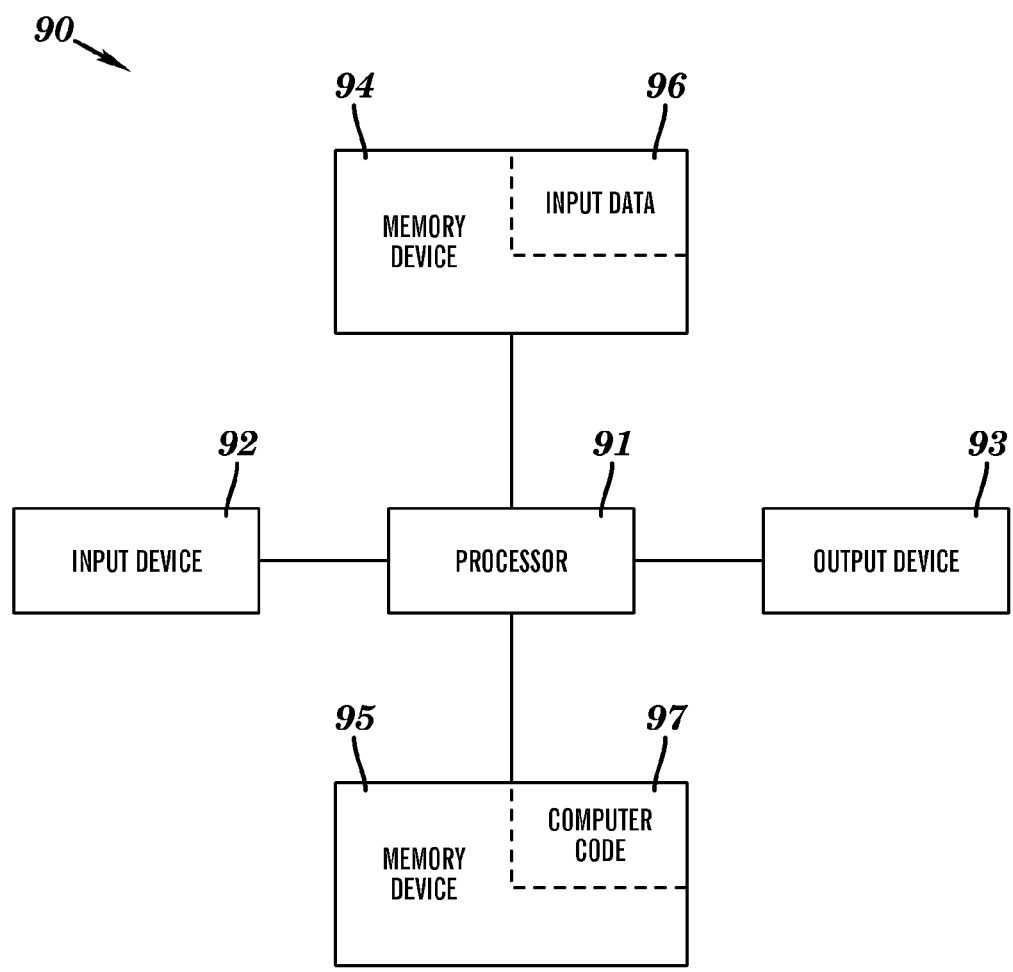
FIG. 6 illustrates a computer apparatus for securing access to distributed data, in accordance with embodiments of the present invention.

FIG. 6 illustrates a computer apparatus 90 (e.g., computing system 10 of FIG. 1) used for securing access to distributed data across multiple data storage mediums and different physical storage locations, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-5) for securing access to distributed data across multiple data storage mediums and different physical storage locations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 3-5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to secure access to distributed data across multiple data storage mediums and different physical storage locations. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for securing access to distributed data across multiple data storage mediums and different physical storage locations. In another embodiment, the invention provides a business method that performs the process steps of the invention on a subscription, advertising, and/or fee basis. That is, a service provider, such as a Solution Integrator, could offer to secure access to distributed data across multiple data storage mediums and different physical storage locations. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

receiving, by a computer processor of a computing system from a requestor, a request for access to specified data;

extracting, by said computer processor from said request, a requestor identification string associated with said requestor;

first verifying, by said computer processor, a match for said requestor identification string against a requestor registry;

retrieving, by said computer processor, a service requestor identification string associated with a service requesting said specified data;

second verifying, by said computer processor, a match for said service requestor identification string against a service registry;

retrieving, by said computer processor, a requestor software component operating process identification string associated with a requestor software component requesting said specified data;

third verifying, by said computer processor, a match for said requestor software component operating process identification string against a process registry;

retrieving, by said computer processor, a requestor server identification string associated with a requestor server requesting said specified data;

fourth verifying, by said computer processor, a match for said requestor server identification string against a server registry;

retrieving, by said computer processor, a requestor hardware device network address and a requestor media access control (MAC) address associated with a requestor hardware device requesting said specified data;

fifth verifying, by said computer processor, a match for said requestor hardware device network address and said requestor MAC address against a network registry;

retrieving, by said computer processor, a requestor hardware device identification string associated with said requestor hardware device requesting said specified data;

sixth verifying, by said computer processor, a match for said requestor hardware device identification string against a device registry;

extracting, by said computer processor from said request, a provider identification string associated with a provider of said specified data;

seventh verifying, by said computer processor, a match for said provider identification string against a provider registry;

retrieving, by said computer processor, a service provider identification string associated with a service providing said specified data;

eighth verifying, by said computer processor, a match for said service provider identification string against said service registry;

retrieving, by said computer processor, a provider software component operating process identification string associated with a provider software component providing said specified data;

ninth verifying, by said computer processor, a match for said provider software component operating process identification string against said process registry;

retrieving, by said computer processor, a provider server identification string associated with a provider server providing said specified data;

tenth verifying, by said computer processor, a match for said provider server identification string against said server registry;

retrieving, by said computer processor, a provider hardware device identification string associated with said provider hardware device providing said specified data; and eleventh verifying, by said computer processor, a match for said provider hardware device identification string against said device registry;

generating, by said computer processor, an access point door associated with a specified logical storage room representation, said logical storage room representation comprising a storage space comprised by a plurality of different storage mediums and physical storage locations, said logical storage room representation comprising said specified data;

cross-referencing, by said computer processor, verification results of said first verifying, said second verifying, said third verifying, said fourth verifying, said fifth verifying, said sixth verifying, said seventh verifying, said eighth verifying, said ninth verifying, said tenth verifying, and said eleventh verifying;

generating, by said computer processor, a scorecard comprising results of said cross-referencing, wherein said scorecard comprises: a Score_Card ID entry comprising a unique record for each scorecard record; a Scorecard_

Results entry providing a tabulated value of the scorecard and determining pass or failure of a combined verification test; and a plurality of verification results entries comprising said verification results;

determining, by said computer processor, that said scorecard comprises a valid integration pattern;

generating, by said computer processor based on said valid integration pattern, a logical key associated with said access point door;

generating, by said computer processor based on said valid integration pattern, a logical lock associated with said logical key;

enabling, by said computer processor, said logical lock with said logical key;

determining, by said computer processor based, that a time stamp associated with said logical lock and said logical key is valid;

enabling, by said computer processor based on said scorecard comprising said results of said cross-referencing, said valid integration pattern, said enabling said logical lock with said logical key, and said time stamp being valid, access to said specified data via said access point door and said specified logical storage room representation; and disabling, by said computer processor, said logical lock using said logical key.

2. The method of claim 1, further comprising:
retrieving, by said computer processor, a provider hardware device network address and a provider MAC address associated with a provider hardware device providing said specified data;
twelfth verifying, by said computer processor, a match for said provider hardware device network address and said provider MAC address against said network registry;
wherein said enabling said access to said specified data is further based on second results of said twelfth verifying.

3. The method of claim 2, further comprising:
retrieving, by said computer processor, a first global unique identifier (GUID) associated with a requestor operating system requesting said specified data;
verifying, by said computer processor, said first GUID against a GUID validator;
retrieving, by said computer processor, a second GUID associated with a provider operating system providing said specified data; and
verifying, by said computer processor, said second GUID against said GUID validator, wherein said enabling said access to said specified data is further based on results of said verifying said first GUID and results of said verifying said second GUID.

4. The method of claim 1, wherein said generating said access point door comprises:
generating, by said computer processor, a first random number;
generating, by said computer processor, a first specified number; and
appending, by said computer processor, said first specified number to said first random number.

5. The method of claim 4, wherein said generating said logical key comprises:
generating, by said computer processor, a second random number;
generating, by said computer processor, a second specified number; and
appending, by said computer processor, said second specified number to said second random number.

6. The method of claim 5, wherein said generating said logical key comprises:
generating, by said computer processor, a third random number;
generating, by said computer processor, a third specified number; and
appending, by said computer processor, said third specified number to said third random number.

7. A computer program product, comprising a computer readable storage device storing a computer readable program code embodied therein, said computer readable program code configured to perform the method of claim 1 upon being enabled by said processor of said computing system.

8. A process for supporting computer infrastructure, said process comprising providing at least one support service for at least one of creating, integrating, hosting, maintaining, and deploying computer-readable code in said computer processor, wherein the code in combination with the computer processor is capable of performing the method of claim 1.

9. A computing system comprising a computer processor coupled to a computer-readable memory unit, said memory unit comprising instructions that when enabled by the computer processor implements a verification method comprising:
receiving, by said computer processor from a requestor, a request for access to specified data;
extracting, by said computer processor from said request, a requestor identification string associated with said requestor;
first verifying, by said computer processor, a match for said requestor identification string against a requestor registry;
retrieving, by said computer processor, a service requestor identification string associated with a service requesting said specified data;
second verifying, by said computer processor, a match for said service requestor identification string against a service registry;
retrieving, by said computer processor, a requestor software component operating process identification string associated with a requestor software component requesting said specified data;
third verifying, by said computer processor, a match for said requestor software component operating process identification string against a process registry;
retrieving, by said computer processor, a requestor server identification string associated with a requestor server requesting said specified data;
fourth verifying, by said computer processor, a match for said requestor server identification string against a server registry;
retrieving, by said computer processor, a requestor hardware device network address and a requestor media access control (MAC) address associated with a requestor hardware device requesting said specified data;
fifth verifying, by said computer processor, a match for said requestor hardware device network address and said requestor MAC address against a network registry;
retrieving, by said computer processor, a requestor hardware device identification string associated with said requestor hardware device requesting said specified data;
sixth verifying, by said computer processor, a match for said requestor hardware device identification string against a device registry;

extracting, by said computer processor from said request, a provider identification string associated with a provider of said specified data;
seventh verifying, by said computer processor, a match for said provider identification string against a provider registry;
retrieving, by said computer processor, a service provider identification string associated with a service providing said specified data;
eighth verifying, by said computer processor, a match for said service provider identification string against said service registry;
retrieving, by said computer processor, a provider software component operating process identification string associated with a provider software component providing said specified data;
ninth verifying, by said computer processor, a match for said provider software component operating process identification string against said process registry;
retrieving, by said computer processor, a provider server identification string associated with a provider server providing said specified data;
tenth verifying, by said computer processor, a match for said provider server identification string against said server registry;
retrieving, by said computer processor, a provider hardware device identification string associated with said provider hardware device providing said specified data; and
eleventh verifying, by said computer processor, a match for said provider hardware device identification string against said device registry;
generating, by said computer processor, an access point door associated with a specified logical storage room representation, said logical storage room representation comprising a storage space comprised by a plurality of different storage mediums and physical storage locations, said logical storage room representation comprising said specified data;
cross-referencing, by said computer processor, verification results of said first verifying, said second verifying, said third verifying, said fourth verifying, said fifth verifying, said sixth verifying, said seventh verifying, said eighth verifying, said ninth verifying, said tenth verifying, and said eleventh verifying;
generating, by said computer processor, a scorecard comprising results of said cross-referencing, wherein said scorecard comprises: a Score_Card ID entry comprising a unique record for each scorecard record; a Scorecard_Results entry providing a tabulated value of the scorecard and determining pass or failure of a combined verification test; and a plurality of verification results entries comprising said verification results;
determining, by said computer processor, that said scorecard comprises a valid integration pattern;
generating, by said computer processor based on said valid integration pattern, a logical key associated with said access point door;
generating, by said computer processor based on said valid integration pattern, a logical lock associated with said logical key;
enabling, by said computer processor, said logical lock with said logical key;
determining, by said computer processor based, that a time stamp associated with said logical lock and said logical key is valid;
enabling, by said computer processor based on said scorecard comprising said results of said cross-referencing, said valid integration pattern, said enabling said logical lock with said logical key, and said time stamp being valid, access to said specified data via said access point door and said specified logical storage room representation; and
disabling, by said computer processor, said logical lock using said logical key.

10. The computing system of claim 9, wherein said method further comprises:
retrieving, by said computer processor, a provider hardware device network address and a provider MAC address associated with a provider hardware device providing said specified data;
twelfth verifying, by said computer processor, a match for said provider hardware device network address and said provider MAC address against said network registry;
wherein said enabling said access to said specified data is further based on second results of said twelfth verifying.

11. The computing system of claim 10, wherein said method further comprises:
retrieving, by said computer processor, a first global unique identifier (GUID) associated with a requestor operating system requesting said specified data;
verifying, by said computer processor, said first GUID against a GUID validator;
retrieving, by said computer processor, a second GUID associated with a provider operating system providing said specified data; and
verifying, by said computer processor, said second GUID against said GUID validator, wherein said enabling said access to said specified data is further based on results of said verifying said first GUID and results of said verifying said second GUID.

12. The computing system of claim 9, wherein said generating said access point door comprises:
generating, by said computer processor, a first random number;
generating, by said computer processor, a first specified number; and
appending, by said computer processor, said first specified number to said first random number.

13. The computing system of claim 12, wherein said generating said logical key comprises:
generating, by said computer processor, a second random number;
generating, by said computer processor, a second specified number; and
appending, by said computer processor, said second specified number to said second random number.

14. A method comprising:
defining, by a computer processor of a computing system, a requestor identification string associated with a requestor of data;
adding, by said computer processor, said requestor identification string to a requestor registry;
generating, by said computer processor, a requester verification component configured to enable a verification process that authenticates a service requester identification string match within a service request and defined with said requester registry, wherein said requester verification component comprises a requester table listing all registered requesters for services, and wherein said requester table comprises a Requester ID entry comprising a unique record for each requester record and a Requester Description entry describing each said requester;
defining, by said computer processor, a provider identification string associated with a provider of said data;
adding, by said computer processor, said provider identification string to a provider registry;
generating, by said computer processor, a provider verification component configured to enable a verification process authenticating service provider identification within a service request and defined with said provider registry, wherein said provider verification component comprises a provider table listing all registered providers of services, wherein the provider table comprises a Provider ID entry comprising a unique record for each provider record and a Provider Description entry describing each said provider;

defining, by said computer processor, a service identification string associated with said services associated with said data;

adding, by said computer processor, said service identification string to a security registry;

generating, by said computer processor, a service verification component configured to enable a verification process that authenticates said services comprising an internal application interface to a function, wherein said service verification component comprises a service table comprising service records;

generating, by said computer processor, a security data model comprising said requester verification component, said provider verification component, and said service verification component;

deploying, by said computer processor, said services to a server platform;

adding, by said computer processor, results of said deploying to a server registry;

executing, by said computer processor, said security data model, wherein said executing said security data model results in:

generating, by said computer processor, an access point door associated with a specified logical storage room representation, said logical storage room representation comprising a storage space comprised by a plurality of different storage mediums and physical storage locations, said logical storage room representation comprising said data;

cross-referencing, by said computer processor, verification results of: verifying a match for said requestor identification string against said requestor registry; verifying a match for said service requestor identification string against said service registry; verifying a match for a requestor software component operating process identification string against a process registry; verifying a match for a requestor server identification string against said server registry; verifying a match for a requestor hardware device network address and a requestor MAC address against a network registry; verifying a match for a requestor hardware device identification string against a device registry; verifying a match for said provider identification string against said provider registry; verifying a match for a service provider identification string against said service registry; verifying a match for a provider software component operating process identification string against said process registry; verifying a match for a provider server identification string against said server registry; verifying a match for a provider hardware device identification string against said device registry;

generating, by said computer processor, a scorecard comprising results of said cross-referencing, wherein said scorecard comprises: a Score Card ID entry comprising a unique record for each scorecard record of scorecard records; a Scorecard Results entry providing a tabulated value of the scorecard and determining pass or failure of a combined verification test; and a plurality of verification results entries comprising said verification results;

determining, by said computer processor, that said scorecard comprises a valid integration pattern;

generating, by said computer processor based on said valid integration pattern, a logical key associated with said access point door;

generating, by said computer processor based on said valid integration pattern, a logical lock associated with said logical key;

enabling, by said computer processor, said logical lock with said logical key;

determining, by said computer processor based, that a time stamp associated with said logical lock and said logical key is valid; and enabling, by said computer processor based on said scorecard comprising said results of said cross-referencing, said valid integration pattern, said enabling said logical lock with said logical key, and said time stamp being valid, access to said data via said access point door and said specified logical storage room representation; and disabling, by said computer processor, said logical lock using said logical key.

15. The method of claim 14, further comprising:

generating, by said computer processor, a software component operating identification string associated with said data;

adding, by said computer processor, said software component operating identification string to said process registry;

generating, by said computer processor, a software component global unique identifier (GUID) associated with said data;

adding, by said computer processor, said software component GUID to a GUID registry;

defining, by said computer processor, a network address and a media access control (MAC) address associated with said requestor and said provider of said data;

adding, by said computer processor, said network address and said MAC address to said network registry;

defining, by said computer processor, a hardware device identification string associated with said data;

adding, by said computer processor, said hardware device identification string to a hardware registry; and storing, by said computing system, said requestor registry, said provider registry, said security registry, said server registry, said process registry, said GUID registry, said network registry, and said hardware registry.

16. A computer program product, comprising a computer readable storage device storing a computer readable program code embodied therein, said computer readable program code configured to perform the method of claim 14 upon being enabled by said processor of said computing system.

17. A process for supporting computer infrastructure, said process comprising providing at least one support service for at least one of creating, integrating, hosting, maintaining, and deploying computer-readable code in said computer processor, wherein the code in combination with the computer processor is capable of performing the method of claim 14.

18. A computing system comprising a processor coupled to a computer-readable memory unit, said memory unit comprising a computer readable code configured to be enabled by the processor to perform the method of claim 14.

* * * * *